United States Patent
Akita et al.

(10) Patent No.: US 8,036,823 B2
(45) Date of Patent: Oct. 11, 2011

(54) NAVIGATION SYSTEM

(75) Inventors: Takashi Akita, Hyogo (JP); Takahiro Kudoh, Kyoto (JP); Tsuyoshi Kindo, Osaka (JP); Takuya Hirai, Osaka (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 12/090,521

(22) PCT Filed: Oct. 17, 2006

(86) PCT No.: PCT/JP2006/320669
§ 371 (c)(1),
(2), (4) Date: Apr. 17, 2008

(87) PCT Pub. No.: WO2007/049483

PCT Pub. Date: May 3, 2007

(65) Prior Publication Data
US 2010/0153000 A1   Jun. 17, 2010

(30) Foreign Application Priority Data
Oct. 26, 2005   (JP) .................................. 2005-310771

(51) Int. Cl.
*G01C 21/00* (2006.01)
(52) U.S. Cl. ........................................ 701/201; 715/764
(58) Field of Classification Search .................. 701/201, 701/211, 208, 200, 210, 209, 207; 348/47; 340/995.19, 995.16, 901
See application file for complete search history.

(56) References Cited

U.S. PATENT DOCUMENTS

| 5,323,321 A | | 6/1994 | Smith, Jr. |
| 5,638,279 A | * | 6/1997 | Kishi et al. .................... 701/200 |
| 5,694,122 A | | 12/1997 | Nakada |
| 6,266,613 B1 | | 7/2001 | Nimura et al. |
| 7,383,126 B2 | * | 6/2008 | Takahashi ..................... 701/211 |
| 2003/0214576 A1 | * | 11/2003 | Koga ............................. 348/47 |
| 2004/0162672 A1 | | 8/2004 | Kim |

(Continued)

FOREIGN PATENT DOCUMENTS
DE   44 12 859   11/1994
(Continued)

OTHER PUBLICATIONS

International Search Report mailed Jan. 16, 2007 for International Application No. PCT/JP2006/320669.
(Continued)

*Primary Examiner* — Thomas Black
*Assistant Examiner* — Marthe Marc-Coleman
(74) *Attorney, Agent, or Firm* — Wenderoth, Lind & Ponack, L.L.P.

(57) ABSTRACT

A navigation system generating a display which enables an intuitive and instant grasp of a distance to a guide point (such as a guide target intersection) is provided. The navigation system displays an object on a route between the vicinity of a vehicle position and the guide point, and includes a object display control section which calculates a distance from an arbitrary point on the route between the vehicle position and the guide point to the guide point, and sets a mode for displaying the object in accordance with the distance from the arbitrary position on the route to the guide point. The object display control section sets, for example, a display color, a pattern, or a shape of the object in accordance with the distance from the arbitrary point on the route to the guide point.

17 Claims, 10 Drawing Sheets

U.S. PATENT DOCUMENTS

| | | | |
|---|---|---|---|
| 2004/0236507 A1* | 11/2004 | Maruyama et al. | 701/208 |
| 2004/0240056 A1* | 12/2004 | Tomisawa et al. | 359/462 |
| 2005/0273252 A1 | 12/2005 | Nix et al. | |
| 2006/0058945 A1* | 3/2006 | Watanabe | 701/200 |
| 2006/0195257 A1* | 8/2006 | Nakamura | 701/211 |
| 2008/0021641 A1 | 1/2008 | Kim | |

FOREIGN PATENT DOCUMENTS

| | | | |
|---|---|---|---|
| DE | 100 39 687 | | 2/2000 |
| EP | 1 445 583 | | 8/2004 |
| JP | 06-147909 | | 5/1994 |
| JP | 08-190696 | | 7/1996 |
| JP | 09-145389 | | 6/1997 |
| JP | 409243389 | * | 9/1997 |
| JP | 2001-074480 | | 3/2001 |
| JP | 2001-074486 | | 3/2001 |
| JP | 2001-074487 | | 3/2001 |
| JP | 2005-214857 | | 8/2005 |
| WO | 92/00568 | | 1/1992 |
| WO | 2004/099718 | | 11/2004 |

OTHER PUBLICATIONS

Informal Comments submitted for International Application No. PCT/JP2006/320699 filed on Oct. 17, 2006.

European Search Report issued Jul. 23, 2010 in corresponding European Application No. 06811915.5.

* cited by examiner

F I G. 6
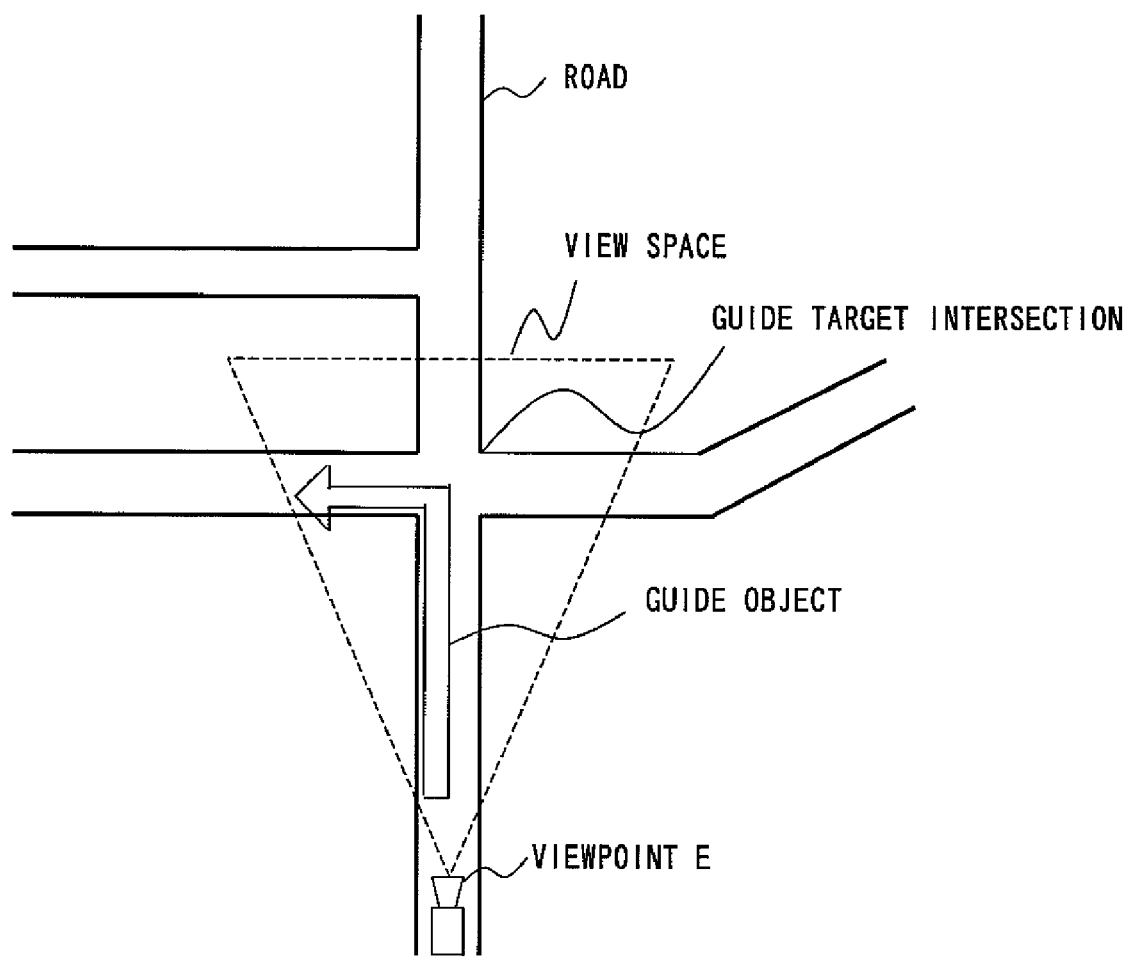

NAVIGATION SYSTEM

TECHNICAL FIELD

The present invention relates to a navigation system, and more specifically relates to a navigation system generating a display which enables an intuitive and instant recognition of a distance to a guide point.

BACKGROUND ART

In recent years, a navigation system has become widely available which displays a map of an area surrounding a vehicle position, calculates a route from the vehicle position to a destination, and performs a route guide in accordance with the calculated route. In the navigation system, a guide route is displayed on a map image so as to be distinguishable from other roads (by changing a color thereof, or by making a line of the route thick, for example). Alternatively, when the vehicle reaches a location at a predetermined distance from an approaching intersection on the guide route, a guide map of the intersection is displayed on the map image (for example, as an enlarged map of the intersection). Accordingly, a driver can understand a road to be traveled or a direction to proceed at the intersection.

However, during driving, it is difficult for the driver to understand interrelation between the vehicle position displayed on the map and an actual vehicle position, and thus there has been posed a problem in that the driver makes a turn before the guide target intersection and a problem in that the driver passes through the intersection. Therefore, in order to show the driver a distance to the guide target intersection, a technique has been disclosed in which, in accordance with a distance between the vehicle position and the guide target intersection, a color of an arrow, which shows a direction to proceed at the intersection, is changed (Patent document 1). Patent document 1: Japanese Laid-Open Patent Publication No. 6-147909

SUMMARY OF THE INVENTION

Problems to be Solved by the Invention

However, according to the conventional technique disclosed in above-described Patent document 1, in accordance with the distance between the vehicle position and the guide target intersection, the color of the arrow is changed (for example, when the vehicle reaches a location 300 m before the intersection, the color of the arrow is changed to red, when the vehicle reaches a location 200 m before the intersection, the color of the arrow is changed to yellow, and when the vehicle reaches a location 100 m before the intersection, the color of the arrow is changed to blue). Accordingly, only a distance between the two points, i.e., the vehicle position and the guide target intersection, is shown, and the driver cannot obtain information on a distance between the guide target intersection and a halfway point between the vehicle position and the guide target intersection. Therefore, during driving at a location relatively far from the intersection (for example, at a location 300 m before the intersection), the driver cannot obtain a measure indicative of a distance between the location and a location proximity to the intersection (for example, a location 100 m before the intersection), and thus a problem is posed in that it is difficult to understand the distance to the intersection and also difficult to intuitively grasp when to prepare for making a turn.

Particularly in the case where the guide is performed by using a display which is close to an actual scene viewed by the driver, for example, by placing an arrow on a route in a photographed image, it tends to be difficult to understand the distance from a display in which the arrow is wholly drawn in a single color as disclosed in the conventional technique, and be also difficult to specify the intersection at which a turn is to be made.

Further, in the conventional technique, the driver can only confirm a distance between the two points, i.e., the vehicle position and the guide target intersection, at a moment when the driver views a screen. Therefore, the driver cannot grasp positional information on a location 100 m before the intersection when the driver travels at a location further before the location (e.g., a location 300 m before the intersection). The driver can finally grasp the positional information on the location 100 m before the intersection when the vehicle actually reaches the position. Accordingly, in order to confirm a distance to the guide target intersection, the driver needs to check constantly a change in the color of the arrow, and consequently, the driver needs to focus on the screen or view the screen frequently.

Therefore, an object of the present invention is to provide a navigation system generating a display which enables an intuitive and instant recognition of a distance to a guide point.

Solution to the Problems

To achieve the above-described object, the present invention has the following aspects. A navigation system according to the present invention displays an object on a route between a vehicle position and a guide point, and comprises an object display control section for calculating a distance from an arbitrary position on the route to the guide point, the route being between the vehicle position and the guide point, and for setting a mode for displaying the object in accordance with the calculated distance. The guide point is a target point to be guided by the navigation system, and is typified by a guide target intersection (an intersection at which the a vehicle making a turn to the right or the left), a destination, and a stopover. The arbitrary position on the route includes the guide point and the vehicle position.

As an example, the object display control section sets a display color of the object in accordance with the distance from the arbitrary position on the route to the guide point. Accordingly, information on a distance between a halfway point to the guide point and the guide point is also displayed. Therefore, the driver can obtain a measure to grasp a sense of distance, and becomes able to grasp the distance to the guide point intuitively and instantly. Consequently, the driver no longer needs to focus on a screen constantly, and thus is able to drive safely. Further, since the display color of the object is changed in accordance with the distance from the arbitrary point on the route to the guide point, the driver can grasp the distance to the guide point intuitively even though the driver does not clearly understand the relation between the display color and the distance.

Preferably, the object display control section sets the display color of the object so as to be changed in a gradual manner in accordance with the distance from the arbitrary position on the route to the guide point. Accordingly, the display color is changed continuously in accordance with the distance to the guide point, and at a location closer to the intersection, the display color becomes closer to a color assigned to the guide point. Therefore, the distance to the guide point can be grasped more intuitively.

Further, in the case where the display color is changed at predetermined distance interval in accordance with the distance to the guide point (for example, displayed in red at a distance interval between the guide target intersection to a location 100 m before the intersection, and displayed in blue at a distance interval ranging from 100 m to 200 m before the intersection), the whole of an arrow is displayed in a single display color in the vicinity of the intersection (100 m or less before the intersection, in this case). However, the display color is set so as to be changed in a gradual manner, whereby the display color of the arrow at an arbitrary position can be changed in accordance with the distance from the arbitrary position on the route to the guide point, and thus the driver can constantly grasp the distance to the guide point.

The object display control section may set a pattern on the object in accordance with the distance from the arbitrary position on the route to the guide point. Preferably, the pattern on the object is set such that a density of the pattern becomes higher at a portion of the object closer to the guide point. Accordingly, an effect can be obtained in which the density of the pattern on the object becomes higher in the vicinity of the vehicle position as the vehicle gradually comes closer to the guide point. Accordingly, the driver can grasp the distance to the guide point intuitively.

The object display control section may set a shape of the object in accordance with the distance from the arbitrary position on the route to the guide point. Preferably, the object display control section displays a plurality of the objects, and displays such that the closer to the guide point an object, among the objects, is located, the smaller a size of the object becomes. Accordingly, an effect can be obtained in which the size of the object in the vicinity of the vehicle position becomes gradually smaller as the vehicle comes closer to the guide point, and the driver can grasp the distance to the guide point intuitively.

The object display control section may overlay the object on the photographed image. Accordingly, it is possible to grasp the distance to the guide point intuitively on the photographed image on which an actual scene ahead of the vehicle is reflected as it is, and also possible to easily grasp the distance to the guide point on the actual scene lying ahead of the windshield. Preferably, the object overlaid on the photographed image is processed through transparency processing so as to be seen transparently. Accordingly, it is possible to avoid a situation in which the scene ahead of the vehicle (such as vehicles traveling ahead) is covered and cannot be seen.

Effect of the Invention

In the navigation system according to the present invention, as is clear from the above-described solution to solve the problems, it is possible to generate a display which enables an intuitive and instant grasp of a distance to a guide point. Accordingly, the driver does not need to constantly focus on a screen, and is able to drive safely.

BRIEF DESCRIPTION OF THE DRAWINGS

FIG. 6 is a diagram showing a location of a guide object in a three-dimensional map space.

Figure 1:
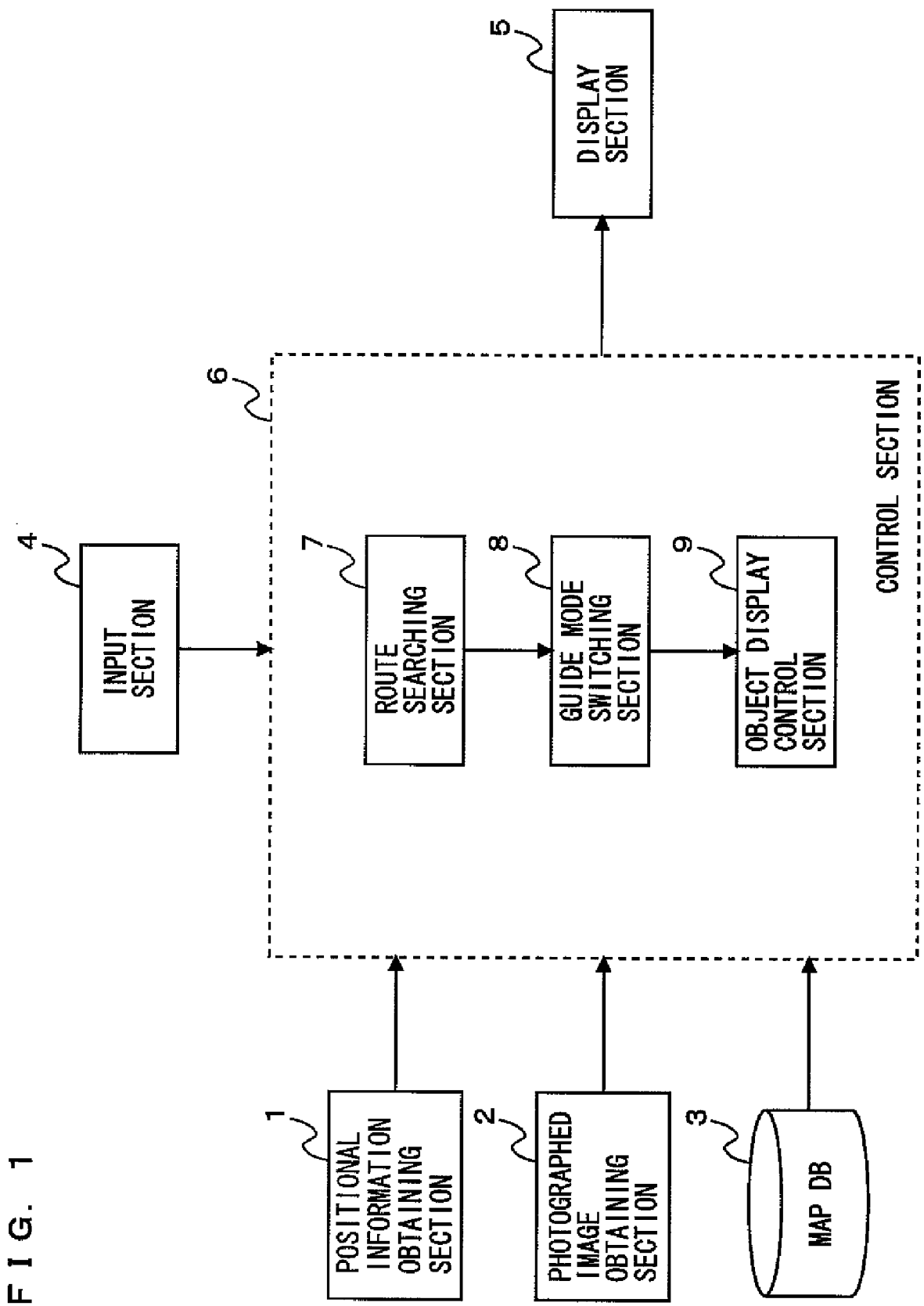
FIG. 1 is a diagram showing a configuration of a navigation system according to the present invention.

DESCRIPTION OF THE REFERENCE CHARACTERS 1 position determining section
2 photographed image obtaining section
3 map DB
4 input section
5 display section
6 control section
7 route searching section
8 guide mode switching section
9 object display control section

DETAILED DESCRIPTION OF THE INVENTION

Hereinafter, a navigation system according to the present invention will be described with reference to diagrams. In each of the diagrams, component parts which are not related to the present invention are omitted. FIG. 1 is a configuration diagram showing a general configuration of the navigation system according to the present invention. The navigation system is composed of a position determining section 1, a photographed image obtaining section 2, a map DB 3, an input section 4, a display section 5 and a control section 6.

The position determining section 1 is a position determining sensor for obtaining information on a vehicle position, and is typified by a GPS (Global Positioning System) and a gyroscope fixed to a vehicle. The photographed image obtaining section 2 is a camera for picking up an image forward of the vehicle. The image to be picked up may be either of a still image or a moving image.

The map DB3 is means for storing map information necessary for route guiding and searching, and is, for example, realized by an HDD and a DVD.

The input section 4 is means for inputting, to the navigation system, information relating to a destination, and is composed of a remote control, a touch panel, a microphone for inputting sounds, and the like. The display section 5 displays a map image and a photographed image, and is typified by a LCD display, for example.

The control section 6 is, for example, a CPU, and is composed of a route searching section 7, a guide mode switching section 8 and an object display control section 9. With reference to the information relating to the destination inputted by the input section 4, the vehicle position information obtained by the position determining section 1, and the map DB3, the route searching section 7 searches a route to the destination. With reference to the vehicle position information obtained by the position determining section 1 and a guide route searched by the route searching section 7, the guide mode switching section 8 calculates a distance to a guide target intersection which the vehicle is to pass through subsequently. When a distance to the guide target intersection is greater than a predetermined distance (a mode switching distance), a map image is displayed (a map display mode), whereas when the distance to the guide target intersection is equal to or less than the predetermined distance, the photographed image is displayed (a photographed image display mode).

In the photographed image display mode, the object display control section 9 overlays a guide object on a position of a road in the photographed image so as to indicate a guide route. Accordingly, when the driver approaches the guide target intersection, the driver can recognize an intersection to be turned at while viewing the photographed image which reflects an actual scene ahead as it is. Further, the object display control section 9 calculates a distance from an arbitrary position on the route between the vehicle position and the guide target intersection to the guide target intersection, and sets the display color of the guide object in accordance with the calculated distance. An operation of the object display control section 9 will be described later in detail.

Figure 2:
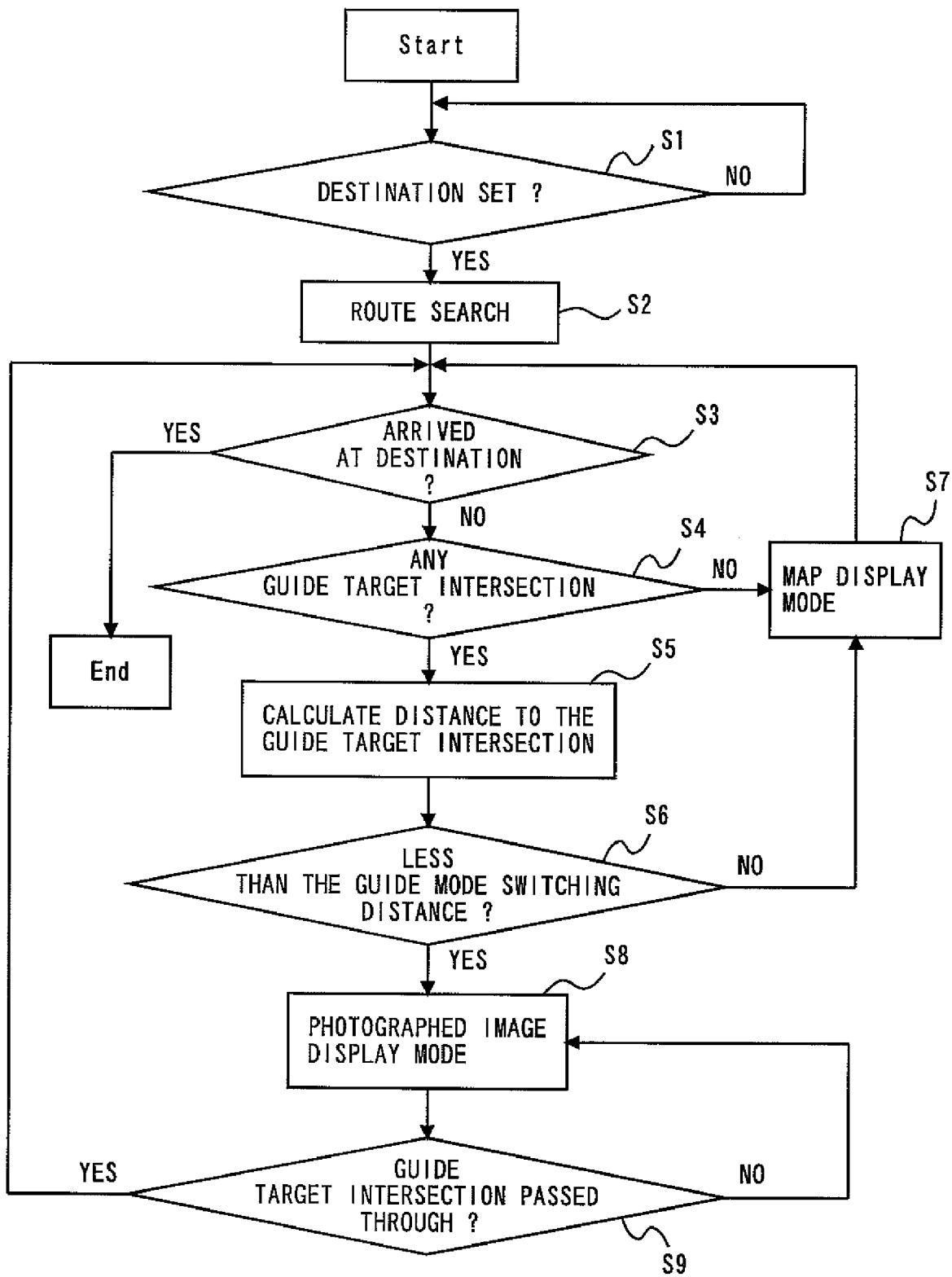
FIG. 2 is a flowchart showing an operation of the navigation system according to the present invention.

Next, an operation of the navigation system according to the present invention will be described with reference to the diagrams. FIG. 2 is a flowchart showing the operation of the navigation system according to the present invention. When the destination is set to the navigation system (YES in S1) by using the input section 4, the route searching section 7 searches the route to the destination in accordance with vehicle position information obtained by the position determining section 1 (S2). When it is confirmed that the vehicle is yet to arrive at the destination (NO in S3), the guide mode switching section 8 searches whether or not a guide target intersection exists on the route between the vehicle position and the destination (S4). When the guide target intersection does not exist on the route between the vehicle position and the destination (NO in S4), a guide is performed in the map display mode in which the guide object is overlaid on the guide route in the map (S7). On the other hand, when the guide target intersection exists on the route between the vehicle position and the destination (YES in S4), a distance between the vehicle position and the guide target intersection which the vehicle is subsequently passes through is calculated (S5). Thereafter, the distance between the vehicle position and the guide target intersection is calculated on a regular basis.

Next, the guide mode switching section 8 determines whether the distance between the vehicle position and the guide target intersection is greater or lower than a guide mode switching distance (for example, a distance of 300 m to the guide target intersection) (S6). When the distance to the guide target intersection is greater than the guide mode switching distance (NO in S6), a guide is performed in the map display mode (S7). On the other hand, when the distance to the guide target intersection is equal to or lower than the guide mode switching distance (YES in S6), a guide is switched to the photographed image display mode in which the photographed image obtained by the photographed image obtaining section 2 is displayed, and the guide object is overlaid on the photographed image (S8). A guide method in the photographed image display mode will be described later in detail. When the guide mode switching section 8 determines that the vehicle has passed through the guide target intersection (YES in S9), and the guide mode switching section 8 again determines in which mode the guide is to be performed (S4 to S6). When a guide target intersection does not exist on the route from the vehicle position to the destination, or when the distance between the vehicle position and the guide target intersection is greater than the guide mode switching distance, the guide mode is switched to the map display mode. On the other hand, when the distance between the vehicle position and the guide target intersection is equal to or lower than the guide mode switching distance, the photographed image display mode is continuously applied. The route guide is performed until the vehicle arrives at the destination (YES in S3).

Figure 3:
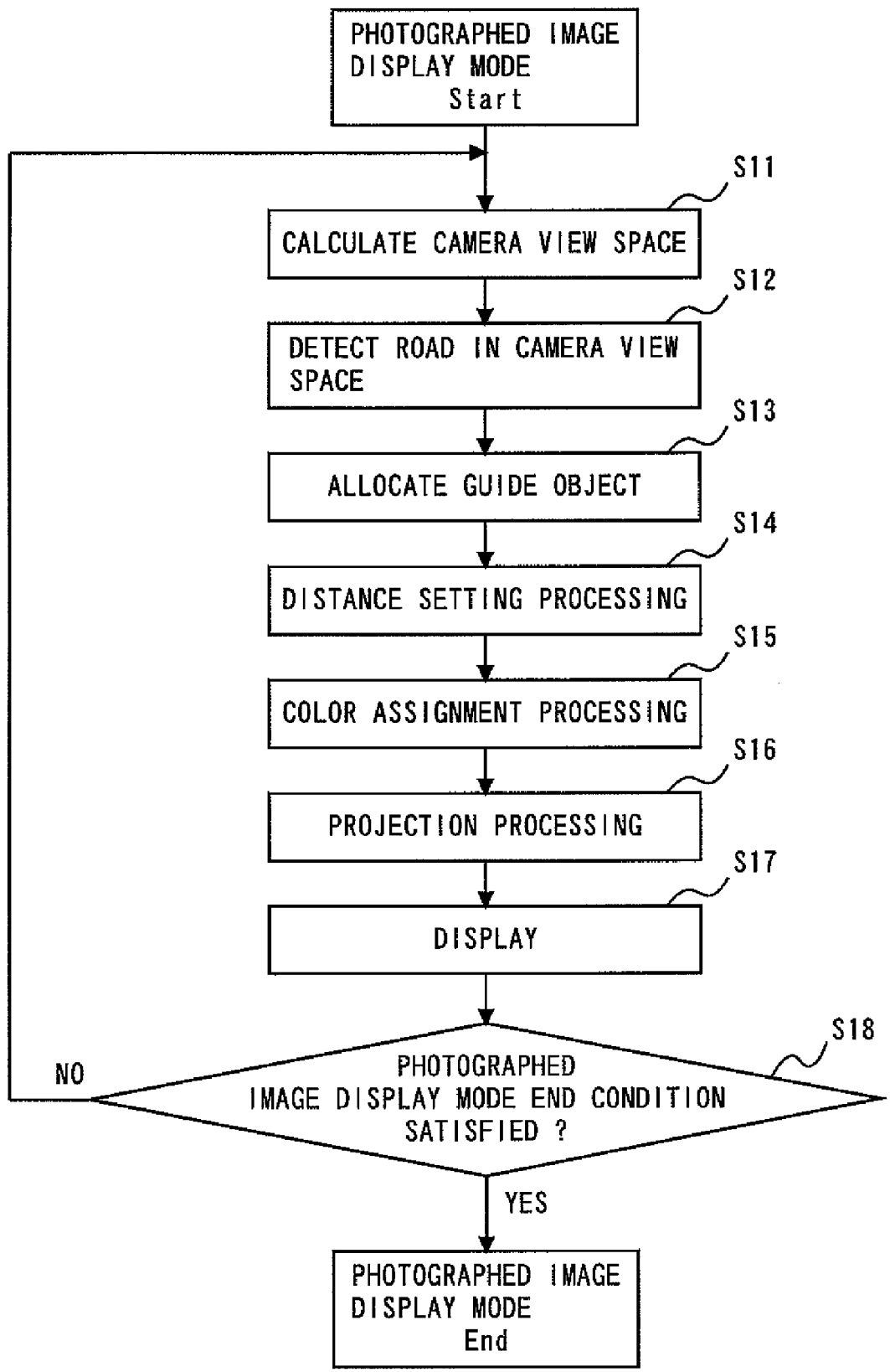
FIG. 3 shows a flowchart showing an operation of a photographed image display mode.

Next, an operation in the photographed image display mode will be described with reference to a flowchart shown in FIG. 3. Based on a three-dimensional map stored in the map DB3, and parameters to determine an imaging direction and an imaging range of the photographed image obtaining section 2, the parameters including a camera position, a camera angle (a horizontal angle and an elevation angle), a focal length and an image size, the object display control section 9 calculates a camera view space in a three-dimensional map space (S11). The three-dimensional map is a map showing positional information based on a latitude, a longitude and an altitude. The camera view space is calculated based on a method shown in FIG. 4, for example. In the three-dimensional map space, a point (point F), which is positioned away from a camera position (viewpoint) E by a focal length f in a camera angle direction, is calculated, and a plain surface (a camera screen) having an x width and a y height, which corresponds to an image size, is placed at the point so as to be perpendicular to a vector from the viewpoint E to the point F. A three-dimensional space, which is created with half-lines connecting between the viewpoint E and points at four corners of the camera screen, is then calculated. Although the three-dimensional space logically extends to infinity, the view space is set at a position which is at an appropriate distance from the viewpoint E. Instead of the three-dimensional map, a camera view space in a two-dimensional map space may be calculated by using the two-dimensional map which is obtained by eliminating height information from the three-dimensional map. Further, the parameters for determining the imaging direction and the imaging range are not limited to those above mentioned. As long as the imaging direction and the imaging range can be determined, other parameters such as a view angle may be used for determination.

Figure 5:
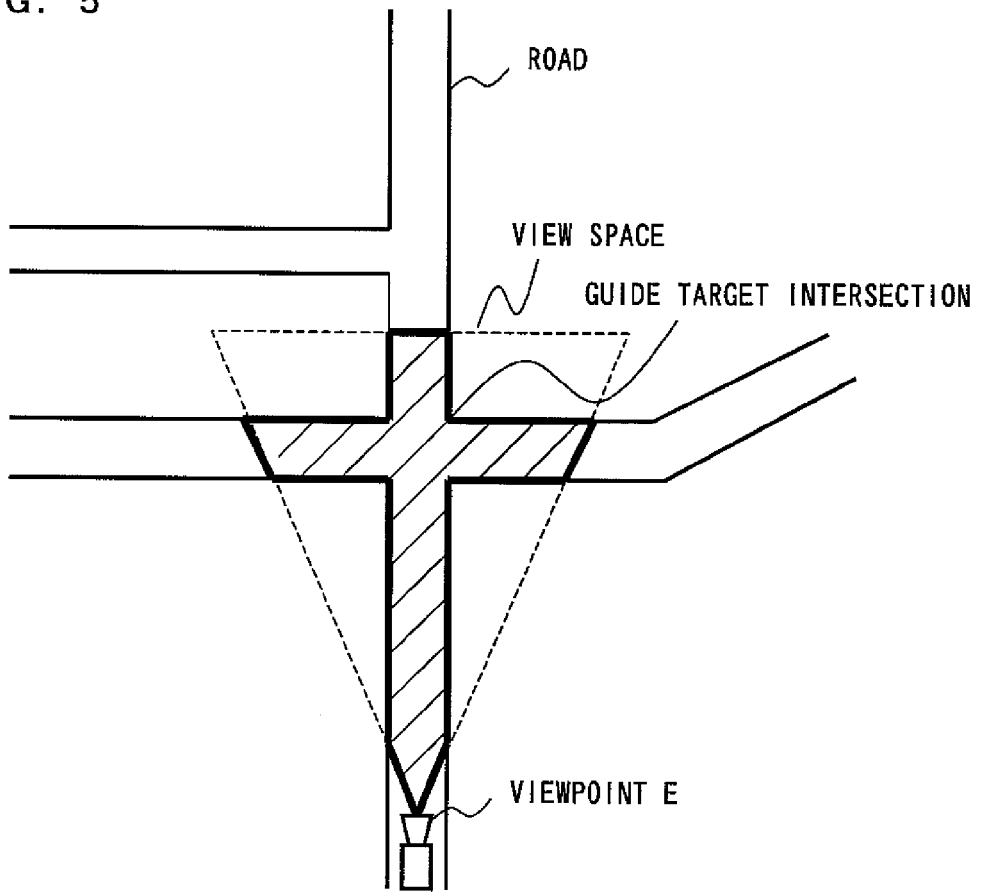
FIG. 5 is a diagram showing portions of roads detected through road detection processing.

The object display control section 9 then performs, in the three-dimensional map space, road detection processing for detecting a road existing in the camera view space and a location thereof (S12). In the road detection processing, overlapping between the camera view space and a road area is calculated in the three-dimensional map space. FIG. 5 shows roads detected through the road detection processing. FIG. 5 is a diagram of the three-dimensional map space and the camera view space as viewed from an upper side thereof. As shown in FIG. 5, the roads in the view space (a portion with slash lines) are detected through the road detection processing.

In the three-dimensional map space, the object display control section 9 then locates the guide object at a location on a road, which corresponds to the guide route searched by the route searching section 7, among roads detected through the road detection processing (S13). FIG. 6 shows a location of the guide object. A shape of the guide object is not limited to an arrow figure as shown in FIG. 6. For example, a broken line figure which is obtained by removing a triangle from a front end of the arrow figure may be applicable.

Figure 7:
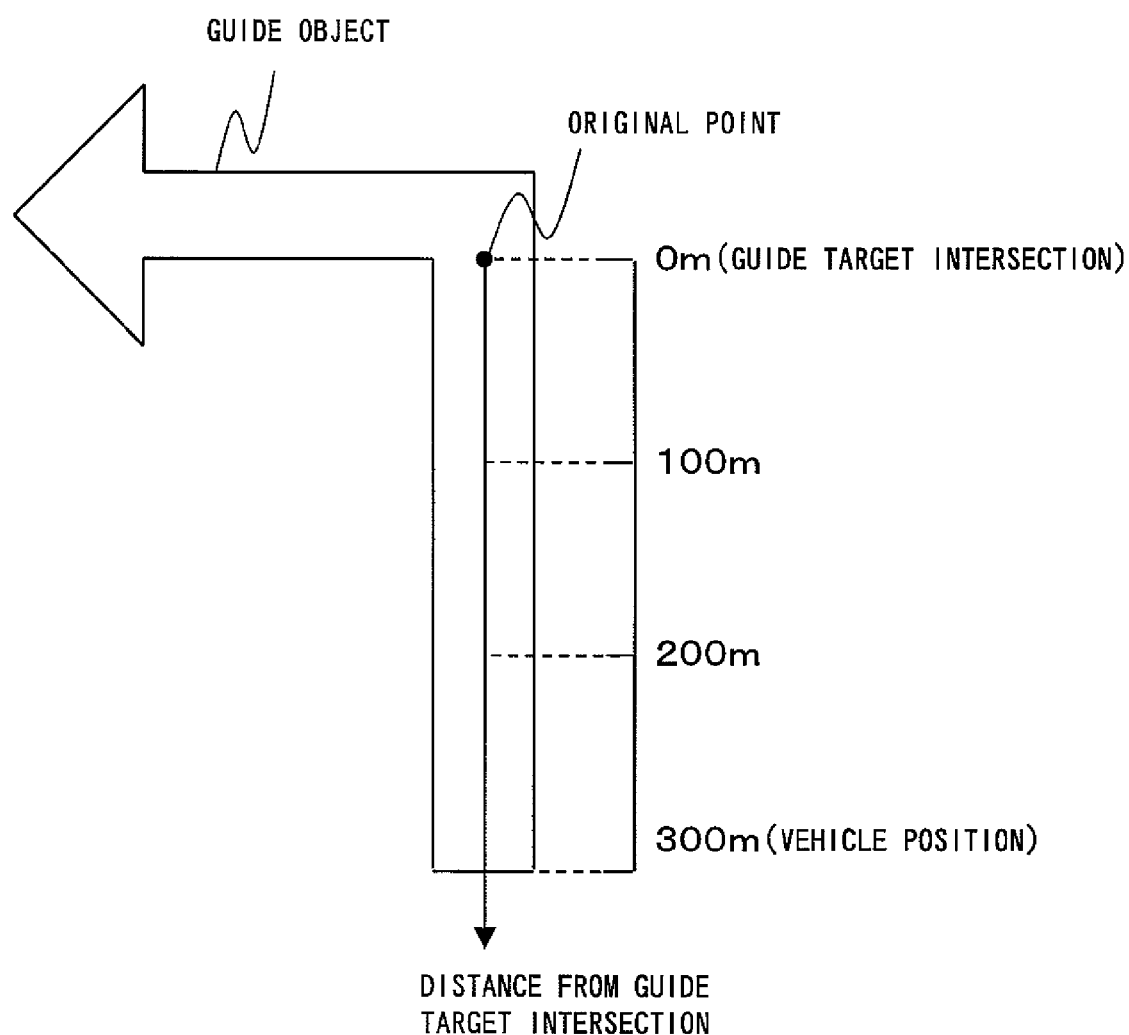
FIG. 7 is a diagram showing a distance setting method in distance setting processing.

The object display control section 9 assigns, to respective points on the guide object, respective distances to the guide target intersection (distance setting processing S14). Specifically, as shown in FIG. 7, the guide target intersection is set as an original point, and the distances from the respective positions to the guide target intersection are calculated along the route. FIG. 7 shows the guide object at a position 300 m before the intersection, and distances to the guide target intersection, which range from 0 to 300 m, are assigned to respective points in between the vehicle position and the guide target intersection. The position (original point) of the guide target intersection is not limited to a location indicated in FIG. 7, but may be any location, for example, at a central part of a bending position of the arrow figure. Further, the distances to the guide target intersection may be assigned to the positions on the guide object on a minimum necessary basis so as to determine the display mode of the guide object.

Figure 8:
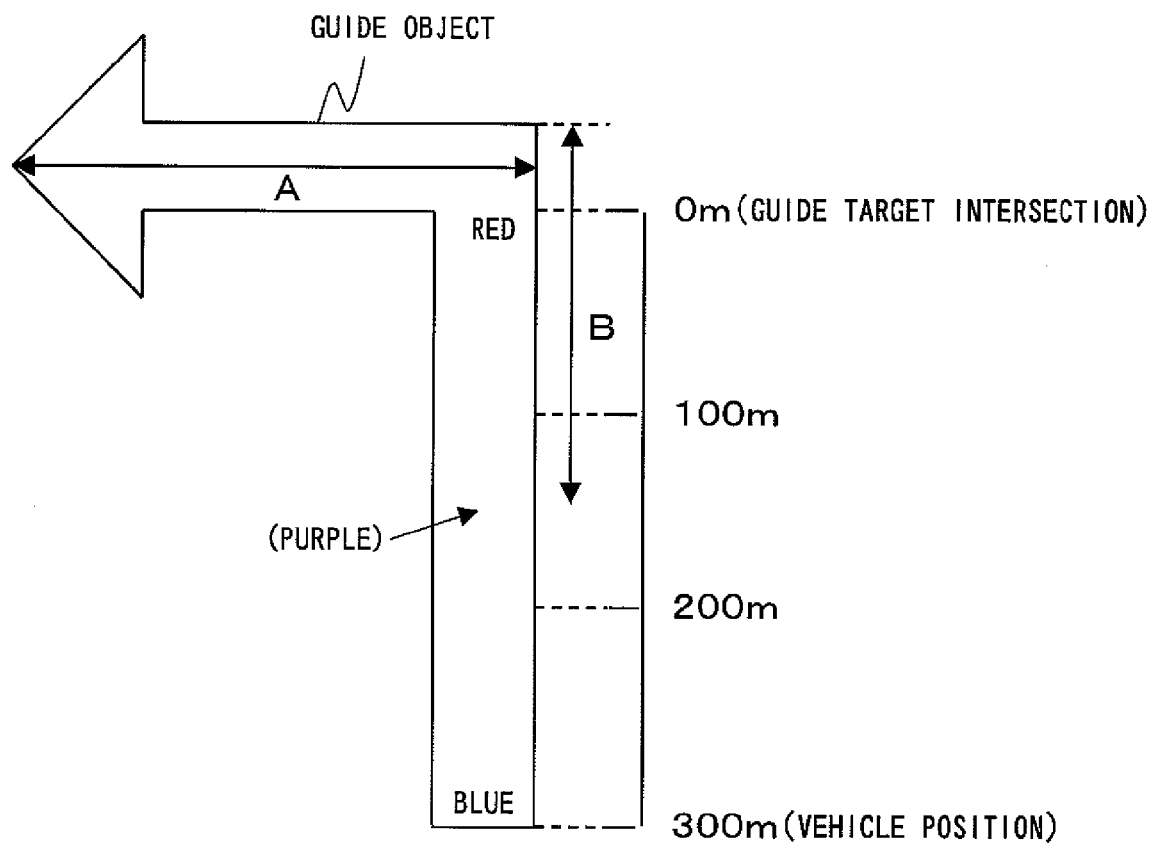
FIG. 8 is a diagram showing the guide object in the three-dimensional space in the case where a display color thereof is changed in a gradual manner in accordance with a distance to the guide target intersection (in the case where reference colors are two of red and blue).

Based on a result of the distance setting processing, the object display control section 9 then arranges a color of the guide object in accordance with the distance to the guide target intersection (color arrangement processing S15). In the color arrangement processing, as shown in FIG. 8, for example, a red color is arranged with respect to a position corresponding to the guide target intersection (the distance to the intersection: 0 m), a blue color is arranged with respect to a position corresponding to the vehicle position (the distance to the intersection: 300 m), and with respect to a section therebetween, a color is changed in a gradual manner in accordance with the distance to the guide target intersection. Accordingly, the color is gradually changed from blue to red, in a range between the vehicle position and the guide target intersection. As shown in FIG. 8, for example, at an intermediate position between the vehicle position and the guide target intersection (a 150 m point to the intersection), a purple color is arranged, which is a halftone between red and blue. With respect to a color of a portion of the guide object, the portion corresponding to a road taken after a turn at the guide target intersection (a portion indicated by range A in FIG. 8), the red color may be arranged in the same manner as the original point. Alternatively, the color may be changed and displayed depending on whether the turn is made to the right or left.

Figure 4:
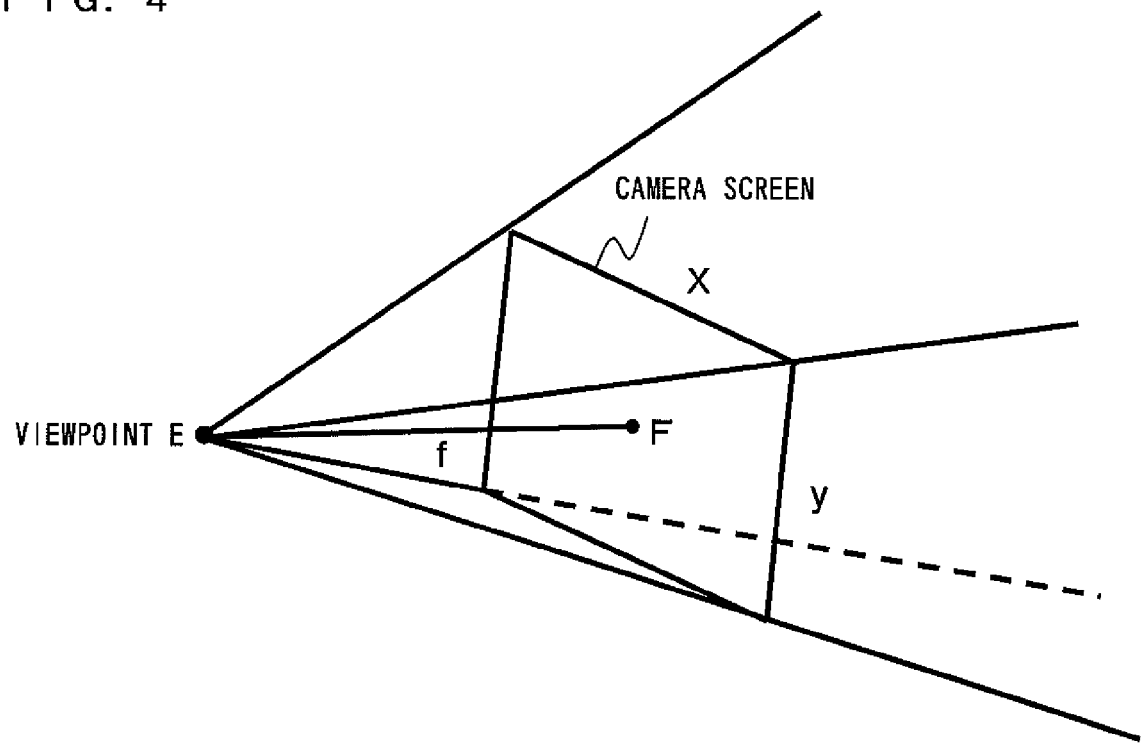
FIG. 4 is a diagram showing a setting method of a camera view space in a three-dimensional map space.

The object display control section 9 performs projection transformation (projection processing, S16) of the guide object by using the camera screen shown in FIG. 4 as a projection plane. The display section 5 overlays the guide object having undergone the projection processing on the photographed image obtained by the photographed image obtaining section 2, and then displays a resultant thereof on the display screen (S17). The projection plane, onto which the guide object is projected in the projection processing, corresponds to the camera screen of the photographed image obtaining section 2, and thus the guide object is overlaid on the road (corresponding to the guide route) shown in the photographed image. When the guide object is overlaid on the photographed image, a position of the guide object to be overlaid may be corrected by detecting a location of the road shot by the camera using a known image recognition technique such as white line detection and road edge detection. The photographed image mode is continuously applied until a photographed image display mode end condition (in which there is no guide target intersection on the route between the vehicle position and the destination, or in which the distance between the vehicle position and the guide target intersection is greater than the guide mode switching distance) is satisfied (YES in S18).

Figure 9:
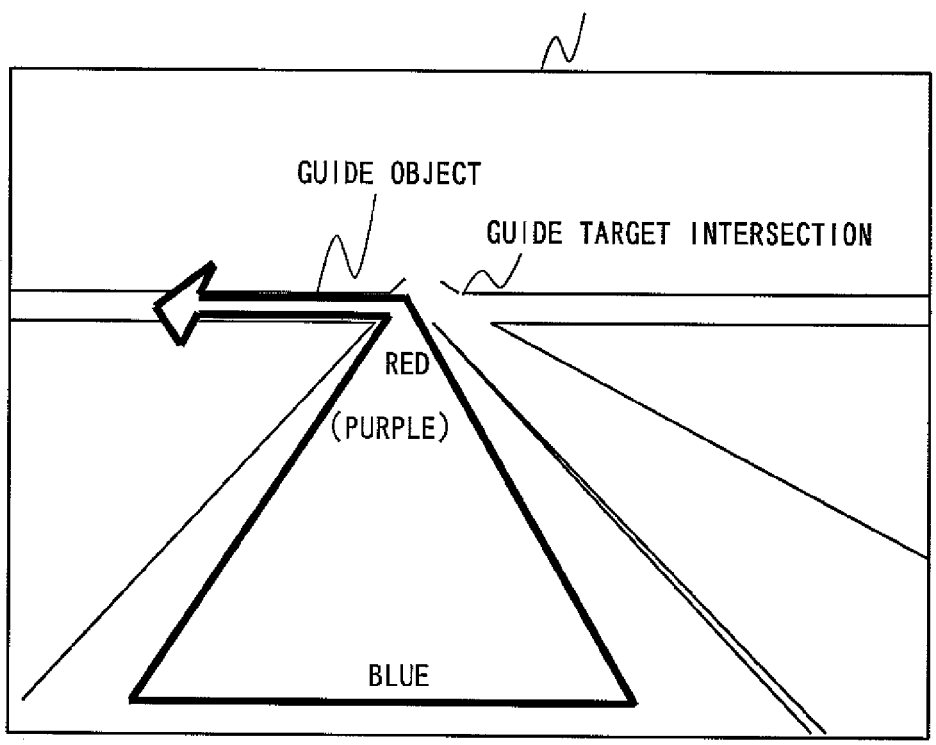
FIG. 9 is a diagram showing the guide object displayed on the display section 5 in the case where the display color thereof is changed in the gradual manner in accordance with the distance (300 m before the intersection) to the guide target intersection.

FIG. 9 is an exemplary display screen displayed on the display section 5 at a location 300 m before the intersection. The guide object shown in FIG. 9 is obtained by projecting the guide object shown in FIG. 8 onto the photographed image. As shown in FIG. 9, the guide object is drawn in red at a portion thereof in the vicinity of the guide target intersection, and drawn in blue at a portion thereof in the vicinity of the vehicle position. As to a section between the vehicle position and the guide target intersection, the color to draw the guide object varies from blue to red in a gradual manner such that a color close to red is arranged to a portion closer to the guide target intersection.

Figure 10:
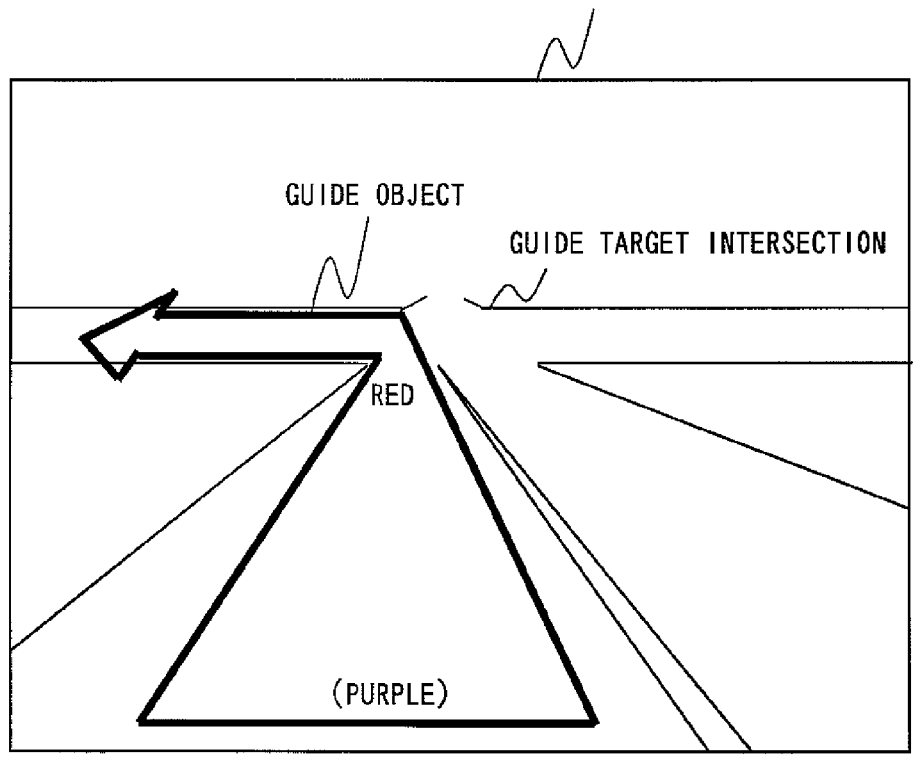
FIG. 10 is a diagram showing the guide object displayed on the display section 5 in the case where the display color thereof is changed in the gradual manner in accordance with the distance (150 m before the intersection) to the guide target intersection.

FIG. 10 a display screen showing a situation in which the vehicle further travels about 150 m from a state shown in FIG. 9, and reaches a location 150 m before the intersection. The color of the guide object is determined based on the distance to the intersection. Therefore, as shown in FIG. 10, at the portion in the vicinity of the guide target intersection, the guide object is drawn in red, in the same manner as in FIG. 9, whereas at the portion in the vicinity of the vehicle position, the guide object is drawn in purple which indicates that the location is 150 m before the intersection. The section between the vehicle position and the guide target intersection is drawn with a color varying from purple to red in a gradual manner such that a portion close to the guide target intersection is drawn in a color close to red. That is, at the location 150 m before the intersection, only a range B of the guide object shown in FIG. 8 is drawn.

As above described, the display color of the guide object is set in accordance with the distance between the arbitrary position on the route and the guide target intersection, whereby information indicative of a relative distance between a halfway point to the guide target intersection and the guide target intersection is also displayed. Accordingly, the driver is able to obtain a measure to grasp a sense of distance, and is also able to grasp intuitively and instantly the distance to the guide target intersection. Particularly, this effect becomes significant since, in the case were the display color of the guide object is set to vary in the gradual manner, as shown in the above described example, the display color varies continuously in accordance with the distance to the guide target intersection, and consequently the display color becomes closer to the color assigned to a portion of the guide target intersection, the portion being in the vicinity of the guide target intersection.

Further, the guide object is overlaid on the position on the road (corresponding to the guide route) in the photographed image, whereby it is possible to intuitively grasp the distance to the guide target intersection on the photographed image on which the actual scene ahead of the vehicle is reflected as it is. Accordingly, it is possible to easily grasp the distance to the guide target intersection in the actual scene lying ahead of the windshield. In this case, an image is displayed by the display section 5 such that the vehicle travels on the guide object drawn on the road. In the case of the above-described example, at the location 300 m before the intersection, a portion of the guide object drawn in blue lies ahead of the vehicle, and a portion drawn in red is viewed far ahead. As the vehicle approaches the guide target intersection, the display changes as if the vehicle travels on the guide object. In the case of the above-described example, as the vehicle approaches the guide target intersection, the color of the guide object in the vicinity of the vehicle becomes closer to red, and further approaches the portion drawn in red gradually. According to the display as above described, it is possible to intuitively grasp the distance to the intersection, and also possible to instantly grasp the distance to the guide target intersection regardless of where the vehicle travels.

Preferably, the guide object overlaid on the photographed image is processed through transparency processing so as to see the background through the guide object. Accordingly, it is possible to avoid a situation in which a scene ahead (e.g., vehicles traveling ahead) of the vehicle is covered by the guide object and cannot be seen.

Figure 11:
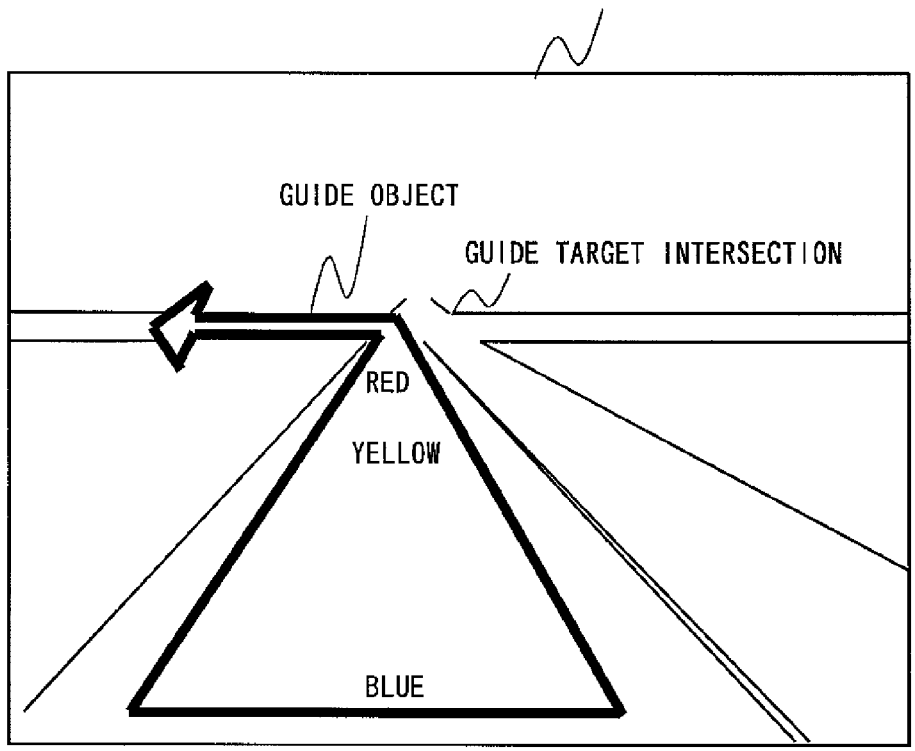
FIG. 11 is a diagram showing the guide object displayed on the display section 5 in the case where the display color thereof is changed in the gradual manner in accordance with the distance to the guide target intersection (in the case where reference colors are three of red, yellow and blue).

In the case of the above-described example, in the color arrangement processing, only two colors, i.e., the red color (representing the guide target intersection) and the blue color (representing the vehicle position) are used as the reference colors, and to the section therebetween, colors between red and blue are assigned. However, the colors used as the reference are not limited to two. For example, as shown in FIG. 11, three colors, i.e., red, yellow, and blue are used as the reference colors, and the color of the portion of the guide object in the vicinity of the vehicle position may be changed from blue to yellow and then to red in a gradual manner as the vehicle approaches the intersection.

Figure 12:
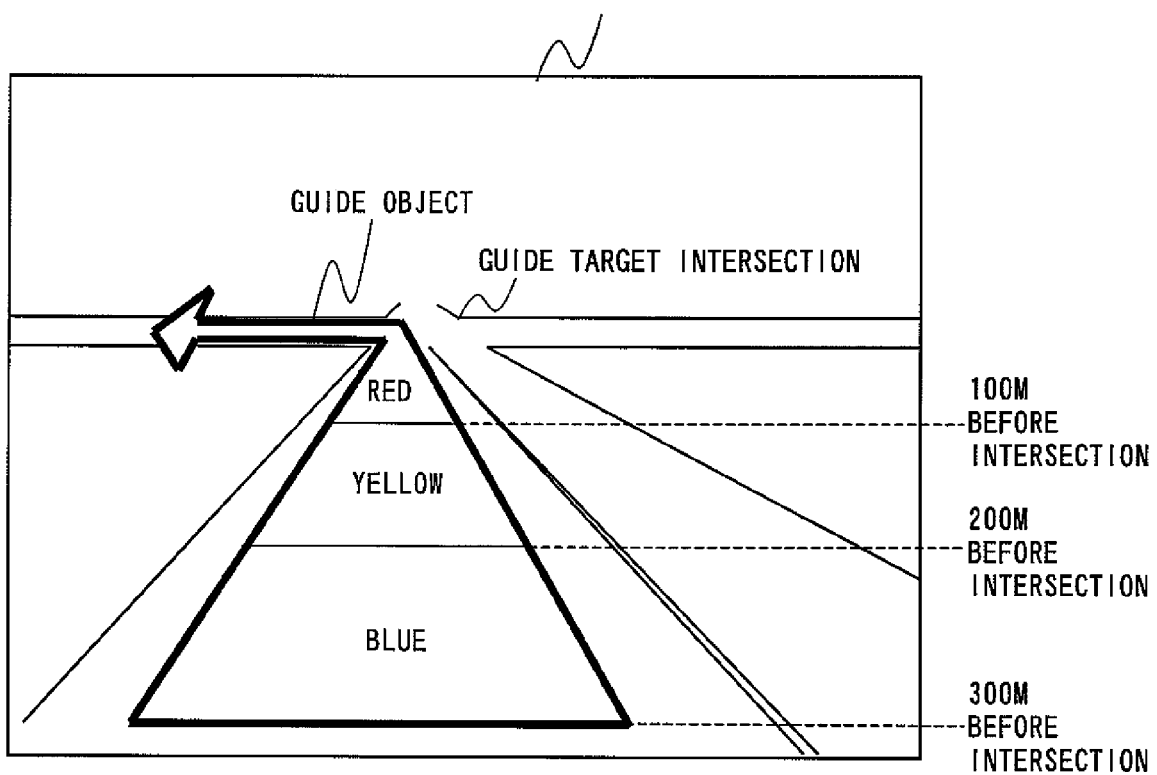
FIG. 12 is a diagram showing the guide object displayed on the display section 5 in the case where the display color thereof is changed at a predetermined distance interval in accordance with the distance to the guide target intersection.

The color set in the color arrangement processing may not necessarily be displayed in a gradual manner. For example, as shown in FIG. 12, a distance interval between the guide target intersection and a position 100 m before the intersection may be displayed in red, a distance interval ranging 100 to 200 m before the intersection may be displayed in yellow, and a distance interval ranging 200 to 300 m before the intersection may be displayed in blue.

Figure 13:
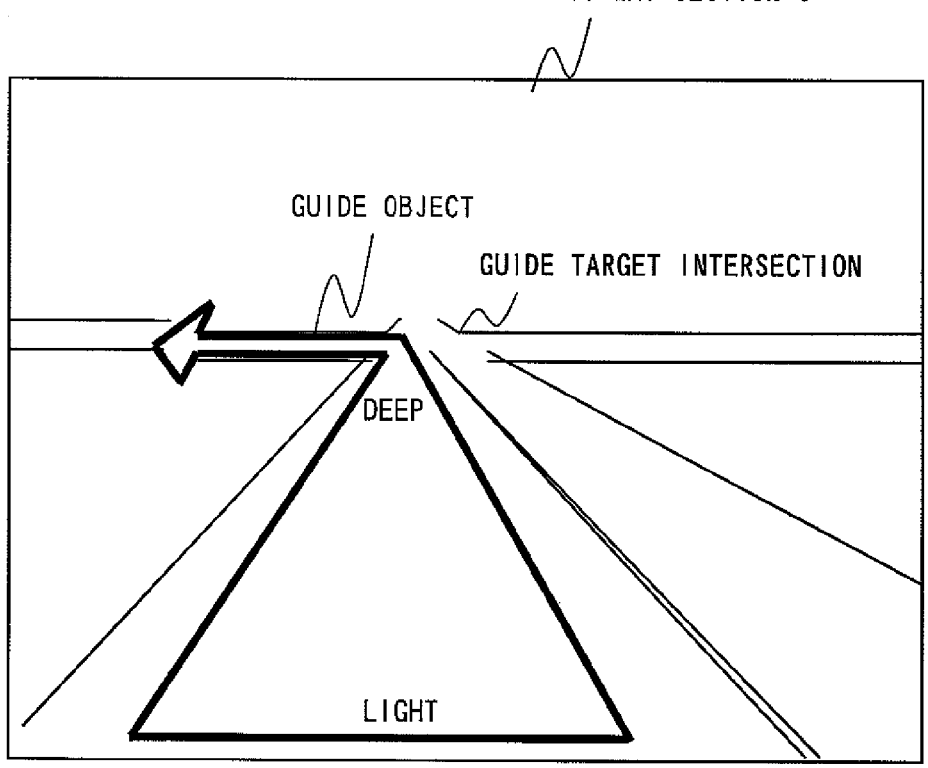
FIG. 13 is a diagram showing the guide object in the case where a density of the display color is changed in accordance with the distance to the guide target intersection.

In addition to the case where a color phase is changed as above described, parameters of the color such as lightness, saturation, a density and a contrast may be changed. FIG. 13 shows a display screen in the case where the density of the color is changed. As shown in FIG. 13, an effect can be obtained in which an area of a deeper color approaches gradually, as the vehicle approaches the intersection.

Figure 14:
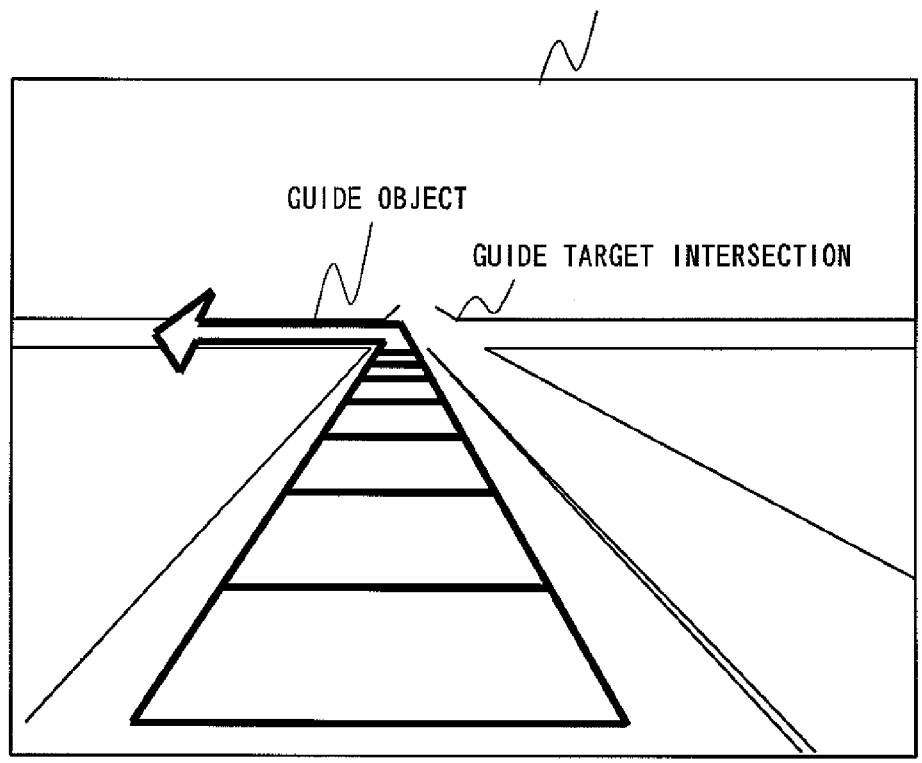
FIG. 14 is a diagram showing the guide object displayed on the display section 5 in the case where a pattern on the guide object is changed in accordance with the distance to the guide target intersection.

In addition to the color, a pattern of the guide object may be changed. FIG. 14 shows a display screen in the case where the pattern of the guide object is changed in accordance with the distance to the guide target intersection. As shown in FIG. 14, at a portion closer to the intersection, spacing of a pattern drawn on the guide object (horizontal lines) is set to become narrower, whereby an effect can be obtained, in which the density of the pattern on the object in the vicinity of the vehicle position becomes higher gradually as the vehicle approaches the guide target intersection. Accordingly, the driver can intuitively recognize the distance to the guide target intersection.

Figure 15:
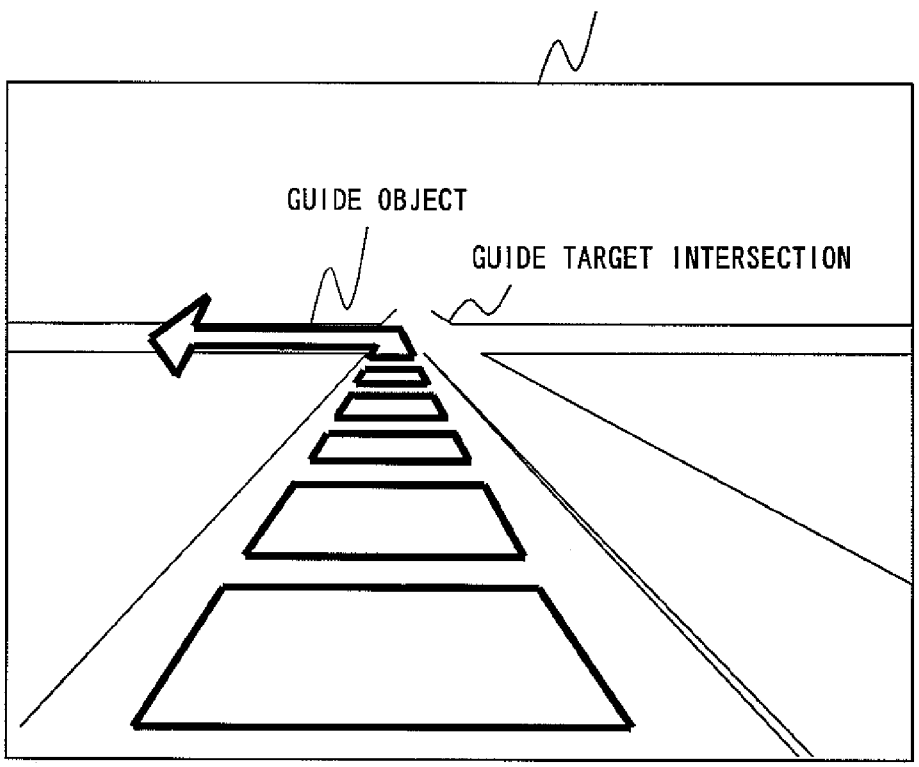
FIG. 15 is a diagram showing the guide object displayed on the display section 5 in the case where a shape of the guide object is changed in accordance with the distance to the guide target intersection.

Further, a shape of the guide object may be changed. As shown in FIG. 15, under the condition where a guide display is configured with a plurality of the guide objects, when the guide objects are arranged such that the object closer to the intersection is of a smaller size, the driver can intuitively recognize the distance to the intersection in the same manner as the case shown in FIG. 14. Without limiting to the above-described examples, any form may be applicable as long as the pattern and the shape of the guide object changes in accordance with the distance to the intersection. The case where any one of the display color, the pattern and the shape of the guide object is changed independently, as above described, may be replaced with a case where the display is performed by using any combination of these.

In the above-described example, a guide point is described as the guide target intersection. However, without limiting to this, the destination, a stopover may be used as the guide point. In this case, when the vehicle reaches a location 300 m before the destination, for example, in the same manner as the above-described case where the guide target intersection is used, the guide is switched to the photographed image display mode, and the color, the shape and the pattern of the guide object is changed in accordance with the distance to the destination, whereby the distance to the destination is displayed in a manner intuitively and easily recognizable by the driver.

The photographed image displayed in the photographed image display mode is obtained from a camera which picks up an image ahead of the vehicle, but may be replaced with a video picture of the intersection which is stored in a HDD or obtained through communication. In the above-described example, a case has been described where the guide object is overlaid on the photographed image display screen and the guide is performed. However, the present invention may be applied to a case where the guide object is overlaid on the guide route in the map display screen, and a color, a shape, a pattern of the guide object may be changed in accordance with the distance to the guide point. In this case, the driver can obtain the measure to grasp the sense of distance, the driver can intuitively and instantly grasp the distance to the guide point. This effect become significant particularly in the case where the present invention is applied to a guide using a driver viewpoint map display in which a realistic scene, which is similar to a scene actually viewed by the driver, is reproduced. Further, the photographed image and the map image are displayed in a dual-screen display mode, and the present invention may be applied to each of the images. In the above-described example, the camera is fixed to the vehicle, but, without limiting to this, may be fixed to a mobile unit such as a cellular phone.

While the invention has been described in detail, the foregoing description is in all aspects illustrative and not restrictive. It is understood that numerous other modifications and variations can be devised without departing from the scope of the invention.

INDUSTRIAL APPLICABILITY

The navigation system according to the present invention exerts an effect of generating a display which enables an intuitive and instant grasp of the distance to the guide point, and is useful as a car navigation system installed in a vehicle, a navigation system for a mobile unit such as a cellular phone, and the like.

The invention claimed is:

1. A navigation system for displaying a guide object on a route between a vehicle position and a guide point, comprising
an object display control section for (i) calculating a distance from the guide object at an arbitrary position on the route to the guide point, the arbitrary position on the route being different than the vehicle position on the route, and (ii) setting a mode for displaying the guide object in accordance with the calculated distance; and
a photographed image obtaining section for obtaining a photographed image of a view ahead of the vehicle,
wherein information on how a halfway point to the guide point is distanced from the guide point is displayed based on the mode for displaying the guide object set by the object control section,
wherein the guide object is located on a route image showing an image of the route between the vehicle position and the guide point, and
wherein the route image is the photographed image obtained by the photographed image obtaining section.

2. The navigation system according to claim 1, wherein the object display control section sets a display color of the guide object in accordance with the calculated distance from the arbitrary position on the route to the guide point.

3. The navigation system according to claim 2, wherein the object display control section sets the display color of the guide object so as to be changed in a gradual manner in accordance with the calculated distance from the arbitrary position on the route to the guide point.

4. The navigation system according to claim 1, wherein the object display control section sets a pattern on the guide object in accordance with the calculated distance from the arbitrary position on the route to the guide point.

5. The navigation system according to claim 4, wherein the object display control section sets the pattern on the guide object such that a density of the pattern becomes higher at a portion of the guide object closer to the guide point.

6. The navigation system according to claim 1, wherein the object display control section sets a shape of the guide object in accordance with the calculated distance from the arbitrary position on the route to the guide point.

7. The navigation system according to claim 6,
wherein the object display control section displays a plurality of guide objects, and
wherein the object display control section displays the plurality of guide objects such that the closer to the guide point a guide object, from among the plurality of guide objects, is located, the smaller a size of the guide object becomes.

8. The navigation system according to claim 1, wherein the object display control section overlays the guide object on the photographed image.

9. The navigation system according to claim 8, wherein the object display control section displays the guide object semi-transparently.

10. The navigation system according to claim 1, further comprising:
a map database for storing a map image;
a guide mode switching section for displaying the map image that is stored in the map database if a distance between the vehicle position and the guide point is greater than a predetermined distance, and displaying the photographed image if the distance between the vehicle position and the guide point is less than the predetermined distance.

11. The navigation system of claim 1, further comprising:
a display section,
wherein the display section displays the guide object in such a manner as to overlay the guide object on the vehicle position and a position ahead of the vehicle position on the photographed image.

12. A navigation system for displaying a guide object on a route between a vehicle position and a guide point, comprising
an object display control section for (i) calculating a distance from the guide object at an arbitrary point on the route to the guide point, the arbitrary position on the route being different than the vehicle position on the route, and (ii) setting a mode for displaying the guide object in accordance with the calculated distance; and
a photographed image obtaining section for obtaining a photographed image of a view ahead of the vehicle,
wherein the object display control section sets a display color of the guide object in accordance with the calculated distance,
wherein the object display control section sets the display color of the guide object so as to be changed in a gradual manner in accordance with the calculated distance,
wherein information on how a halfway point to the guide point is distanced from the guide point is displayed based on the mode for displaying the guide object set by the object control section,
wherein the guide object is located on a route image showing an image of the route between the vehicle position and the guide point, and
wherein the route image is the photographed image obtained by the photographed image obtaining section.

13. The navigation system according to claim 12, wherein the object display control section overlays the guide object on the photographed image.

14. A navigation system for displaying a guide object on a route between a vehicle position and a guide point, comprising
an object display control section for (i) calculating a distance from the guide object at an arbitrary position on the route to the guide point, the arbitrary position on the route being different than the vehicle position on the route, and (ii) setting a mode for displaying the guide object in accordance with the calculated distance; and
a photographed image obtaining section for obtaining a photographed image of a view ahead of a vehicle,
wherein the object display control section sets a pattern on the guide object in accordance with the calculated distance,
wherein the object display control section sets the pattern on the guide object such that a density of the pattern becomes higher at a portion of the guide object closer to the guide point,
wherein information on how a halfway point to the guide point is distanced from the guide point is displayed based on the mode for displaying the guide object set by the object control section,
wherein the guide object is located on a route image showing an image of the route between the vehicle position and the guide point, and
wherein the route image is the photographed image obtained by the photographed image obtaining section.

15. The navigation system according to claim 14, wherein the object display control section overlays the guide object on the photographed image.

16. A navigation system for displaying a guide object on a route between a vehicle position and a guide point, comprising an object display control section for (i) calculating a distance from the guide object at an arbitrary position on the route to the guide point, the arbitrary position on the route being different than the vehicle position on the route, and (ii) setting a mode for displaying the guide object in accordance with the calculated distance; and a photographed image obtaining section for obtaining a photographed image of a view ahead of a vehicle, wherein the object display control section sets a shape of the guide object in accordance with the calculated distance, wherein the object display control section displays a plurality of sub-objects of the guide object on the route between the vehicle position and the guide point, the plurality of sub-objects forming the guide object, wherein the object display control section displays the plurality of sub-objects of the guide object such that the closer to the guide point a sub-object of the guide object, among the plurality of sub-objects of the guide object, is located, the smaller a size of the sub-object of the guide object becomes, wherein information on how a halfway point to the guide point is distanced from the guide point is displayed based on the mode for displaying the guide object set by the object control section, wherein the guide object is located on a route image showing an image of the route between the vehicle position and the guide point, and wherein the route image is the photographed image obtained by the photographed image obtaining section.

17. The navigation system according to claim 16, wherein the object display control section overlays the guide object on the photographed image.

\* \* \* \* \*